United States Patent [19]

Everett

[11] 4,148,698
[45] Apr. 10, 1979

[54] REFINING OF FERROUS AND BASE METAL SULPHIDE ORES AND CONCENTRATES

[75] Inventor: Peter K. Everett, Chatswood, Australia

[73] Assignee: Dextec Metallurgical Proprietary Limited, Australia

[21] Appl. No.: 782,178

[22] Filed: Mar. 28, 1977

[30] Foreign Application Priority Data

Apr. 1, 1976 [AU] Australia ............................. PC5455

[51] Int. Cl.$^2$ ........................... C25C 1/16; C25C 1/18
[52] U.S. Cl. ..................................... 204/118; 204/117
[58] Field of Search ............... 204/117, 118, 119, 113, 204/107

[56] References Cited

U.S. PATENT DOCUMENTS

| | | | |
|---|---|---|---|
| 3,673,061 | 6/1972 | Kruesi | 204/105 R |
| 3,736,238 | 5/1973 | Kruesi | 204/117 |
| 3,891,522 | 6/1975 | McKay et al. | 204/108 |
| 3,923,616 | 12/1975 | Atadan et al. | 204/107 |

Primary Examiner—T. M. Tufariello
Attorney, Agent, or Firm—Edgar N. Jay

[57] ABSTRACT

The invention provides a process for extracting a base metal from a base metal bearing ore or concentrate which includes forming a slurry of the ore or concentrate with an electrolyte containing chloride ions and copper ions, oxygenating the mixture and maintaining the pH of the mixture from 1.5 to 7.0. Iron impurities will be substantially precipitated as ferric oxide and may be recovered, sulphide sulphur will be converted to elemental form and can be recovered and the base metal is taken into solution. The base metal can be recovered by electrolysis which can also produce hydrogen ions for pH maintenance. The copper ions can be precipitated by the addition of fresh ore or concentrate and can be recycled. The process is preferably carried out in a counter-current manner in which electrolyte containing increasing amounts of the base metal in solution is conveyed counter-current to solids which decrease in base metal content. The process is particularly applicable to lead, zinc or lead-zinc ores or concentrates.

5 Claims, 1 Drawing Figure

REFINING OF FERROUS AND BASE METAL SULPHIDE ORES AND CONCENTRATES

FIELD OF THE INVENTION

BACKGROUND OF THE INVENTION

This invention relates to the dissolution and recovery of base metals from base metal sulphides and acid soluble ores and concentrates.

In a particular aspect, the invention relates to those ores and concentrates in which copper is not a major component.

DESCRIPTION OF THE PRIOR ART

The pyrometallurgical treatment of base metal sulphides is expensive, polluting and often requires the disposal of by-product, sulphuric acid.

To overcome the disadvantages of the pyrometallurgical process, particularly pollution, processes have been developed to oxidise sulphides under pressure in autoclaves using ammonia solutions. The plant is expensive, uses large amounts of ammonia, produces large amounts of ammonium sulphate which must be disposed of, and, often requires an associated plant for the production of pure oxygen.

Another process (described in U.S. Pat. No. 3,673,061) accomplishes the oxidation of sulphides at the anode of an electrochemical cell. The presence of iron in the ore causes a very low current efficiency unless electrolytic iron is produced. The process is expensive, requires the marketing of electrolytic iron and sulphur to be economical and has high power costs.

This invention seeks to at least in part reduce the problems associated with the above processes and allows the low cost conversion of base metal ores and concentrates to the metals at atmospheric pressure without the consumption of expensive reagents or the production of by-products with disposal problems.

SUMMARY OF THE INVENTION

This invention provides a process for extracting a base metal from a base metal bearing ore or concentrate which includes forming a slurry of the ore or concentrate with an electrolyte containing chloride ions and copper ions, intimately mixing oxygen bearing gas with the slurry, maintaining the mixture substantially at atmospheric pressure at a temperature up to the boiling point of the electrolyte, and maintaining the pH of the mixture from 1.5 to 7.0, whereby iron solubilised in the process is substantially precipitated as ferric oxide, sulphide sulphur oxidised under the conditions is substantially converted to elemental form, and the base metal is taken into solution.

PREFERRED ASPECTS OF THE INVENTION

A significant preferred aspect of the invention is the catalytic air oxidation of base metal sulphides in aqueous solutions at substantially atmospheric pressure, followed by a simple catalyst recovery step. However, the air oxidation of sulphides is complicated by the nature of the sulphides. A base metal sulphide surface may passivate under certain conditions; this passivation being more severe in sulphate solutions than in chloride solutions.

The introduction of air into an aqueous slurry of finely divided sulphides is complicated by the formation of a froth in the case of sulphate solutions; this problem being very minor in chloride solutions.

Catalysts such as copper can improve the kinetics of air oxidation reactions but this becomes expensive if the catalyst is not recovered. Recovery techniques such as precipitation of copper on zinc powder (as in conventional zinc refineries) can be expensive and precipitation on metallic iron results in an iron removal problem.

The preferred process of this invention utilizes reaction of air or other oxygen bearing gas with a finely divided sulphide bearing ore or concentrate in an aqueous acid chloride electrolyte containing ionic copper, followed by subsequent alteration of the solution oxidation potential to allow precipitation of the ionic copper in sulphide form by reaction with a metal sulphide. Suitable control of the pH of the reaction substantially removes iron from solution in an easily filterable form; thereby reducing a severe problem which occurs in other hydrometallurgical processes.

A convenient method of base metal recovery is by electrolysis which allows regeneration of hydrogen ion by the low current density anodic oxidation of water. Other methods of metal recovery may be employed (such as solvent extraction, cementation, etc.).

The base metals may enter solution according to:

$$Me\ S + 2H^+ + \tfrac{1}{2}O_2 = Me^{++} + S^O + H_2O \tag{1}$$

(where "Me" represents a base metal).

Sulphide iron may enter solution according to:

$$2FeS + 4H^+ + O_2 = 2Fe^{++} + 2S^O + 2H_2O \tag{2}$$

Ferrous iron may be further oxidised to ferric according to:

$$2Fe^{++} + 2H^+ + \tfrac{1}{2}O_2 = 2Fe^{+++} + H_2O \tag{3}$$

Ferric ion may hydrolyse and be precipitated as ferric oxide according to:

$$2Fe^{+++} + 3H_2O = Fe_2O_3 + 6H^+ \tag{4}$$

Addition of equations 2, 3 and 4 for the reaction of iron sulphide yields:

$$2FeS + 1.5\ O_2 = Fe_2O_3 + 2S^O \tag{5}$$

In an electrolytic cell the base metals may plate at the cathode according to:

$$Me^{++} + 2e = Me \tag{6}$$

and oxidation of water at the anode can occur according to:

$$H_2O - 2e = 2H^+ + \tfrac{1}{2}O_2 \tag{7}$$

A competitive anode reaction $2\ Cl - 2e = Cl_2$ (which occurs in much higher acid conditions than normally used in the process of this invention) will assist a leaching part of the process but can make the electrolysis more difficult.

The total process reaction for a base metal sulphide ore which contains iron, for example, as pyrrhotite, can be:

$$MeS + 2Fe\ S + 1.5\ O_2 = Me + 3S + Fe_2O_3 \tag{8}$$

From equation (5) it can be seen that iron has a minor effect on the process economics as:

1. The only reagent consumed is air or other oxygen bearing gas.
2. The concentration in solution can be maintained at very low levels during the process.
3. The iron precipitates in an easily filterable form.

From equation (5) it will be apparent that the process could be used for the production of iron oxide and elemental sulphur from pyrrhotite.

The following examples show the process as applied to lead/zinc ores. Similar results have been obtained with other ores, and no restriction of the process to these base metals is implied. For the purposes of this specification the term "base metals" includes zinc and those metals more noble than zinc.

EXAMPLE 1

A lead-zinc ore analysing 9.5% Zn, 4.5% Pb and 12.5% Fe was mixed with an aqueous electrolyte containing 20% NaCl and 2.5 g.p.l. ionic copper to form a slurry of 100 grams/liter. The temperature was 90° C.

Air was bubbled into the mixture through a porous graphite disperser and hydrochloric acid was added to maintain a pH of approximately 2.5. In one hour 96% of the lead appeared in solution and in 8 hours 95% of the zinc.

The copper concentration in the final solution was 2.3 g.p.l. and the iron concentration 0.4 g.p.l. The residue analysis was 0.45% Zn, 0.2% Pb and 14.0% Fe.

EXAMPLE 2

The filtrate from the above example was reacted with 100 g.p.l. of fresh ore, at 90° C., without the addition of air. The concentration of ionic copper was reduced to less than 5 p.p.m. in 1.5 hours, and the concentration of iron was reduced, in the same period, to less than 100 p.p.m.

EXAMPLE 3

The filtrate from example 2 was passed through an electrochemical diaphragm cell with a high surface area anode.

At the cathode was plated a lead zinc alloy which contained less than 0.5% of metals other than lead and zinc.

The anolyte was 0.3 N acid with traces of chlorine apparent.

EXAMPLE 4

The anolyte effluent from example 3 was reacted in the presence of air with the ore residue from example 2 at 90° C. In excess of 90% of the lead and zinc were leached with a final ionic copper concentration of 2 g.p.l.

The above examples illustrate the elements of cyclic process for the recovery of base metals by air oxidation, without the consumption of copper catalyst or expensive recovery reagents.

The preferred cyclic process comprises the oxidation of the base metal sulphides in the presence of air and ionic copper (example 1), in an aqueous chloride electrolyte followed by adjustment of the solution oxidation potential in the absence of, or in the presence of smaller quantities of air (example 2) for the precipitation of ionic copper, electrolysis to produce base metals (example 3), and redissolution of the copper catalyst in the cell anolyte to allow further oxidation of incoming base metal sulphides (example 4).

The following examples illustrate variations in the process which may occur due to alteration of process conditions. Unless otherwise stated, conditions used were 20% NaCl electrolyte containing 3 g.p.l. of ionic copper initially, 100 g.p.l. of Pb/Zn ore, a temperature of 90° C. and aeration through porous graphite dispersers, with addition of hydrochloric acid to maintain a pH of approximately 2.5.

EXAMPLE 5

Aeration was not started until after the first hour of reaction. The ionic copper concentration dropped from 3 g.p.l. to less than 0.1 g.p.l. in the first hour while 94% of the Pb was extracted. After six hours of aeration only 4% of Zn was leached; illustrating the requirement for ionic copper for effective zinc leaching and the degree of separation of Pb and Zn obtainable by variation in process conditions.

EXAMPLE 6

The slurry concentration was increased to 150 g.p.l. of ore which was added while the electrolyte was aerated. Ionic copper was removed from solution, while in excess of 90% of the lead was leached in 1 hour and less than 10% of the Zn was leached over 16 hour period.

EXAMPLE 7

The same conditions as example 6 were used except that the ore was added gradually over a period of 1 hour. The ionic copper remained in solution and in excess of 90% of the Pb and Zn were leached after 8 hours; indicating the desirability of avoiding a sudden addition of appreciable quantities of ore under those conditions.

EXAMPLE 8

The graphite disperser was replaced with a coarse porosity sintered glass diffuser and a test carried out using 100 g.p.l. of ore. The ionic copper was removed from solution with excellent leaching of Pb and poor leaching of Zn resulting; thereby indicating the requirement for efficient aeration under those conditions, particularly during the addition of the ore.

EXAMPLE 9

During standard tests the air was turned off between 2 and 3 hours, 3 and 4 hours, and 2 and 4 hours, resulting in partial removal of ionic copper from solution, very good leaching of Pb and partial leaching of the Zn. This indicates the problem of insufficient aeration to be mainly in the first hour.

EXAMPLE 10

The copper addition was reduced to 1.5 g.p.l. and the standard conditions used were those normally resulting in good leaching of Pb and Zn. The ionic copper precipitated from solution with good Pb leaching and poor Zn leaching, indicating the need for an initial ionic copper requirement in excess of 1.5 g.p.l., under those conditions.

Figure 1:
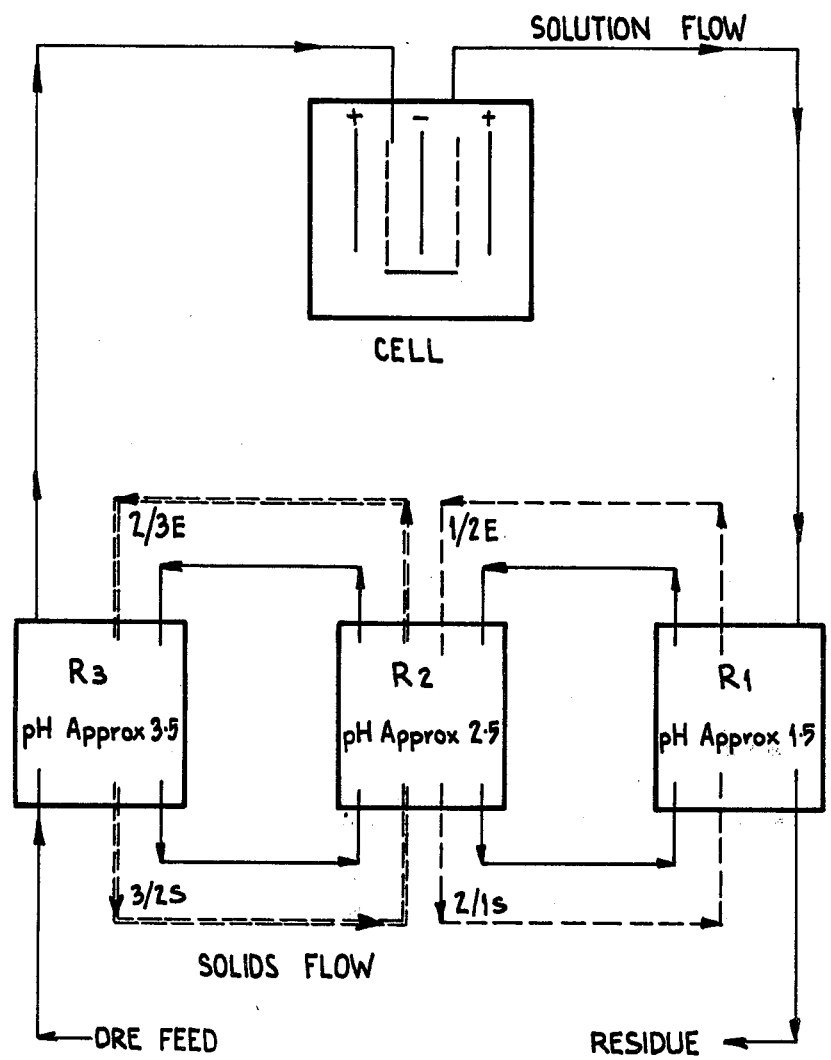
FIG. 1 is a schematic representation of apparatus and is also a flow chart.

One method of operation of the process is by counter-current contacting (for example 3 stages) of the ore and electrolyte in a circuit with an electrolytic diaphragm cell (FIG. 1). Fresh ore entering a reactor R3 (unaerated) would precipitate residual copper (and iron) from solution, to allow copper and iron free electrolyte to pass from reactor R3 to the diaphragm cell.

Underflow from reactor R3 (slurry) would pass to reactors R2 and R1 and hence to a solid/liquid separation step. Copper would be re-dissolved in reactors R2 and R1 by aeration and by the cell anolyte entering reactor R1 and the copper would then be carried back towards reactor R3 in the electrolyte for reprecipitation by the fresh ore entering reactor R3. This would result in a system whereby the copper is contained in the leach tanks thereby preventing contamination of the cell electrolyte and not requiring expensive methods of electrolyte purification.

With reference to FIG. (1), the flow of electrolyte is shown above the reactors and cell, and the flow of solids and slurry below. The broken lines represent the flow of copper catalyst accompanying the various streams, the double broken lines being a major flow of copper and the single broken lines a minor flow.

The stream 3/2S represents the underflow of ore slurry and precipitated copper being transferred from reactor R3 to reactor R2. In reactor R2 a portion of the copper redissolves and the remainder travels via stream 2/1S to reactor R1 where substantially all of the remaining copper is dissolved. Stream 1/2E represents the flow of solid free electrolyte, containing dissolved copper, being transferred to reactor R2. The stream 2/3E represents the flow from reactor R2 to reactor R3 of solid free electrolyte, containing a major amount of dissolved copper (the copper dissolved in reactor R1 plus the copper dissolved in reactor R2). The dissolved copper entering the third reactor essentially all precipitates and is carried towards reactors R1 and R2 in stream 3/2S.

If desired, a number of cells may be used in series in order to provide products with varying ratios of lead and zinc.

A further modification of this process can be carried out by initially treating the ore, in the absence of copper catalysts, for lead recovery, followed by treatment of the residue obtained, for zinc recovery in the manner described above or by other methods. Alternatively, the copper may be allowed to precipitate out of solution as in example 5, allowing the leaching of lead, followed by redissolution of the copper, as in example 4, thereby allowing dissolution of the zinc.

I claim:

1. A process for extracting a base metal from a base metal bearing ore or concentrate, base metal being lead and/or zinc, which includes forming a slurry of the ore or concentrate with an electrolyte containing chloride ions and copper ions, intimately mixing oxygen bearing gas with the slurry, maintaining the mixture substantially at atmospheric pressure at a temperature up to the boiling point of the electrolyte, and maintaining the pH of the mixture from 1.5 to 7.0, whereby iron solubilised in the process is substantially precipitated as ferric oxide, sulphide sulphur oxidised under the conditions is substantially converted to elemental form, and the base metal is taken into solution, mixing the resulting solution with base metal sulphide ore or concentrate to allow the precipitation of ionic copper from solution, separating the solution from the precipitate, and thereafter recovering base metal from the solution.

2. A process as claimed in claim 1 including the further step of mixing the resulting solution with base metal sulphide ore or concentrate to allow the precipitation of ionic copper from solution.

3. A process as claimed in claim 1 wherein the pH is maintained by the addition of anolyte from an electrochemical cell.

4. The process of claim 1 wherein the dissolution of the base metal is carried out in a counter-current contacting system such that said mixing the resulting solution with base metal sulphide ore or concentrate is carried out prior to feeding the resulting electrolyte to the cathode compartment of an electrochemical diaphragm cell and the anolyte from the cell is fed to the counter-current contacting system.

5. A process as claimed in claim 1, wherein the temperature of the mixture is maintained at a temperature of 50° C. or greater.

* * * * *